No. 662,173. Patented Nov. 20, 1900.
D. W. McGRATH.
MORTAR MIXING MACHINE
(Application filed Sept. 7, 1899.)
(No Model.)
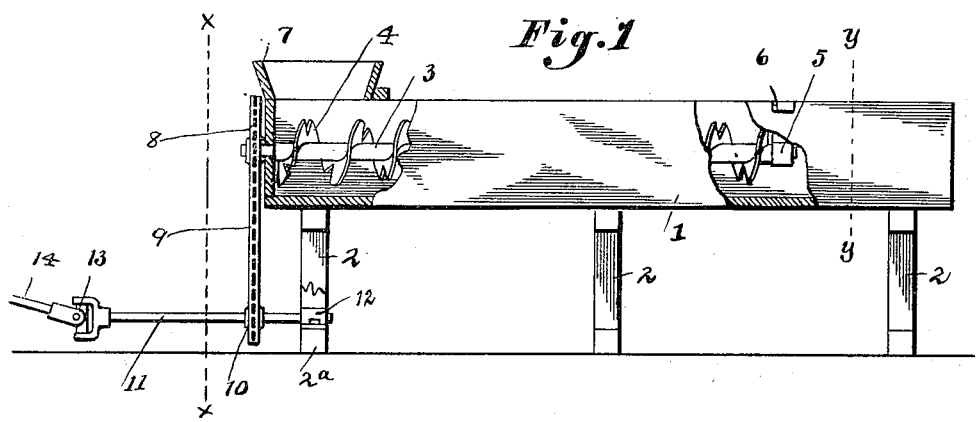
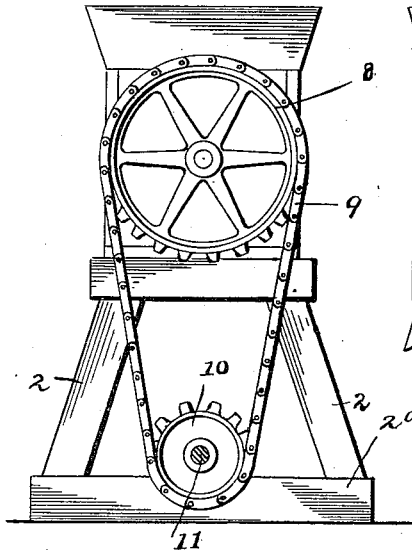
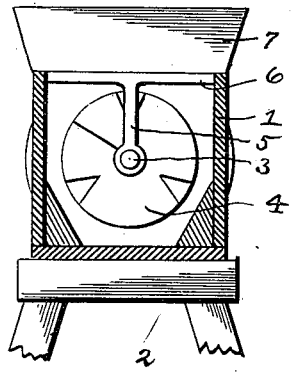
WITNESSES:
INVENTOR
Daniel W. McGrath
BY
C. C. Shepherd
ATTORNEY

UNITED STATES PATENT OFFICE.

DANIEL W. McGRATH, OF COLUMBUS, OHIO.

MORTAR-MIXING MACHINE.

SPECIFICATION forming part of Letters Patent No. 662,173, dated November 20, 1900.

Application filed September 7, 1899. Serial No. 729,696. (No model.)

*To all whom it may concern:*

Be it known that I, DANIEL W. MCGRATH, a citizen of the United States, residing at Columbus, in the county of Franklin and State of Ohio, have invented a certain new and useful Improvement in Mortar-Mixing Machines, of which the following is a specification.

My invention relates to the improvement of mortar-mixing machines; and the objects of my invention are to provide a mortar-mixing machine of simple and inexpensive construction and of such arrangement of parts as to admit of its being readily transported from one point to another, to so construct the same as to insure a thorough mixing of the ingredients forming the mortar and to accomplish this in a rapid manner, to provide means for operating the mixer from a shaft at an angle with the main power-transmitting shaft, and to produce other improvements in details of construction and arrangement of parts, which will be more fully pointed out hereinafter. These objects I accomplish in the manner illustrated in the accompanying drawings, in which—

Figure 1 is a side elevation of my improved mixer, showing portions of the side broken away for the purpose of clearness in illustration. Fig. 2 is an enlarged sectional view on line $x\ x$ of Fig. 1, and Fig. 3 is an enlarged section on line $y\ y$ of Fig. 1.

Similar numerals refer to similar parts throughout the several views.

In carrying out my invention I employ an oblong mixing case or trough, such as is indicated at 1, this case or trough preferably being formed, as indicated in Fig. 3, with its lower portion of reduced width. The mixing-case is supported, as indicated in the drawings, upon suitable supporting-frames 2, which rise from transverse-ground cross-pieces 2ª. Within the case or trough 1 is journaled longitudinally a spiral mixer and agitator 3, the latter consisting of a longitudinally-arranged shaft provided throughout its length with a comparatively wide spiral flange 4, said flange or thread being recessed or notched at intervals, resulting in the production of curved or spiral blade-like projections. Toward the outer or discharging end of the mixer the shaft 3 is journaled in a hanger 5, which depends from a transverse bar 6, which connects the upper sides of the casing 1. The casing 1 is open at its outer end, and at its inner end is provided on its upper side with an upwardly-extending hopper 7, which, being provided with flaring sides, is adapted to first receive the material to be mixed and discharge the same into the inner end of the casing. On the inner end of the shaft 3 and on the outer side of the trough or casing I mount a comparatively large sprocket-wheel 8, which through the medium of a sprocket-chain 9 is connected with a sprocket-pinion 10, which is carried on a horizontal power-shaft 11. One end of the shaft 11 is journaled in a suitable boxing 12, which is supported upon one of the transverse frame-pieces 2ª. The outer end of the shaft 11 is through the medium of a suitable universal joint 13 connected with a shaft 14, to which rotary motion is adapted to be contributed in a desirable manner—such, for instance, as suitable steam, electric, or horse-power mechanism.

In utilizing my improved mechanism the ingredients from which the mortar is to be formed and which it is desired to mix thoroughly are shoveled or otherwise discharged into the open mouth of the hopper 7, from which said material passes downward into the inner end of the trough or casing 1, where through the rotary movement of the mixer 3 it is thoroughly mixed and gradually conveyed during the mixing process by the blades or flanges 4 to the outer end of the casing, from which it is forced by the outward pressure of the mixing-blades. Owing to the employment of the universal joint 13 it is obvious that the mortar-mixer may be arranged at different angles or such angles with the shaft 14 as the space in which the same is used may render most convenient.

It will readily be seen that owing to the spirally-arranged blades of the mixer the material within the casing will not only become thoroughly mixed in its progress through the case, but that this material will be carried out and delivered from the casing in proper condition for successful use.

The construction of my improved mixing device is such as to admit of the same being produced at a comparatively low cost and to admit of its being transported from place to place in an ordinary wagon or conveyance.

Having now fully described my invention, what I claim, and desire to secure by Letters Patent, is—

In a mortar-mixing machine, the combination with a horizontal casing or trough, a transverse bar near the rear end of said trough and a shaft-hanger depending within said trough from said bar, of a shaft having one end journaled in said hanger and its remaining end journaled in one end of the trough, said shaft having a mixing-flange spirally arranged thereon and said flange being separated into blade projections at regular intervals and means for imparting a rotary motion to said shafts, substantially as specified.

DANIEL W. McGRATH.

In presence of—
C. C. SHEPHERD,
A. L. PHELPS.